United States Patent
Kim (10) Patent No.: US 8,133,602 B2
(45) Date of Patent: Mar. 13, 2012

(54) RECHARGEABLE BATTERY

(75) Inventor: Tae-Yong Kim, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 812 days.

(21) Appl. No.: 12/204,038

(22) Filed: Sep. 4, 2008

(65) Prior Publication Data

US 2009/0087724 A1    Apr. 2, 2009

(30) Foreign Application Priority Data

Oct. 2, 2007   (KR) .................. 10-2007-0099313

(51) Int. Cl.
*H01M 2/12* (2006.01)
*H01M 2/34* (2006.01)
*H01H 33/60* (2006.01)

(52) U.S. Cl. ...................... 429/56; 429/65; 218/117

(58) Field of Classification Search .......... 429/56, 429/65, 61; 218/117
See application file for complete search history.

(56) References Cited

U.S. PATENT DOCUMENTS

| | | | |
|---|---|---|---|
| 4,801,772 A * | 1/1989 | Bratkowski et al. | 218/117 |
| 4,943,691 A * | 7/1990 | Mertz et al. | 218/117 |
| 6,004,694 A * | 12/1999 | Van Lerberghe | 429/56 X |
| 6,632,559 B1 * | 10/2003 | Kawamura et al. | 429/56 |
| 7,923,139 B2 * | 4/2011 | Shen et al. | 429/56 X |
| 2005/0214634 A1 * | 9/2005 | Kim | 429/61 X |

FOREIGN PATENT DOCUMENTS

| | | |
|---|---|---|
| JP | P2000-90911 A | 3/2000 |
| KR | 10-158845 | 8/1998 |
| KR | 10-614337 | 8/2006 |
| KR | 10-2007-0076171 | 7/2007 |

OTHER PUBLICATIONS

English Abstract of KR 10-2006-0054635.
Office Action issued by the Korean Intellectual Property Office on Mar. 20, 2009.

* cited by examiner

*Primary Examiner* — Stephen J. Kalafut
(74) *Attorney, Agent, or Firm* — Knobbe Martens Olson & Bear LLP (57) ABSTRACT

A rechargeable battery includes an electrode assembly, a case, a cap assembly, and an arc interrupter. The electrode assembly includes an anode, a cathode, and a separator interposed between the anode and the cathode. The case houses the electrode assembly and has an opening for the electrode assembly, and the cap assembly is coupled to the opening of the case and is electrically connected to the electrode assembly. The arc interrupter includes an interrupting member movably disposed in the cap assembly and a driving member connected to the interrupting member to transfer the interrupting member.

18 Claims, 6 Drawing Sheets

RECHARGEABLE BATTERY

CROSS-REFERENCE TO RELATED APPLICATION

This application claims the benefit of Korean Application No. 2007-99313 filed Oct. 2, 2007, in the Korean Intellectual Property Office, the disclosure of which is incorporated herein by reference.

BACKGROUND OF THE INVENTION

1. Field of the Invention

Aspects of the present invention relate to a rechargeable battery. More particularly, aspects of the present invention relate to a rechargeable battery including a cap assembly having an improved structure.

2. Description of the Related Art

Rechargeable batteries can be repeatedly charged and discharged, unlike primary batteries, which are incapable of being recharged. Low capacity rechargeable batteries composed of a single cell are generally used for portable small electronic devices, such as mobile phones, laptop computer, and camcorders. Large capacity rechargeable batteries composed of a plurality of cells connected in the form of a pack are widely used to drive motors for hybrid electric vehicles. Such a rechargeable battery is manufactured in various forms. The representative form of such a rechargeable battery is a cylindrical form or a quadrilateral form. Such rechargeable batteries are serially connected to form a rechargeable battery module or battery pack to drive the motor of an electric vehicle, which needs a large amount of electric power.

A typical rechargeable battery includes an electrode assembly having an anode and a cathode with a separator interposed therebetween, a case that provides a space to house the electrode assembly, and a cap assembly that closes and seals the case.

In the case of a rechargeable battery formed in a cylindrical shape, an anode uncoated region and a cathode uncoated region where an active material is not coated are formed at the anode and the cathode of the electrode assembly, respectively. The anode uncoated region and the cathode uncoated region are disposed to face in different directions.

A cathode current collecting plate is adhered on the cathode uncoated region, and an anode current collecting plate is adhered on the anode uncoated region. Each of the cathode current collecting plate and the anode current collecting plate is electrically connected to the case or the cap assembly to guide the current to the outside. For example, the cathode electrode current collecting plate may be electrically connected to the case and the anode current collecting plate may be electrically connected to the cap assembly. Alternatively, the cathode electrode current collecting plate may be electrically connected to the cap assembly and the anode current collecting plate may be electrically connected to the case.

The case acts as a cathode terminal when the cathode current collecting plate is electrically connected to the case. A cap plate of the cap assembly acts as an anode terminal when the anode current collecting plate is electrically connected to the cap assembly.

A vent plate is disposed in the cap assembly. The vent plate interrupts an electrical connection between the cap assembly and the electrode assembly if an undesirable or unexpected reaction occurs in the rechargeable battery. In particular, if the pressure of the rechargeable battery becomes greater than a predetermined value, the vent plate is curved outward and a welded portion of the vent plate becomes separated from a portion of the cap assembly that is electrically connected to the electrode assembly. Accordingly, the electrical connection between the electrode assembly and the cap plate is interrupted.

If the pressure increases by an undesirable or unexpected reaction in the rechargeable battery and the vent plate is separated from the cap assembly, an electrical arc may be generated between the separated vent plate and the cap assembly. The electrical arc produces a lot of heat, and thus the temperature of the rechargeable battery increases. In some cases, the electrical arc and increased temperature can cause an explosion of the rechargeable battery.

The above information disclosed in this Background section is only for enhancement of understanding of the background of the invention and may contain information that does not form the prior art that is already known in this country to a person of ordinary skill in the art. In other words, the inclusion of information in this Background section is not to be construed as a representation that any of such information is prior art.

SUMMARY OF THE INVENTION

Aspects of the present invention provide a rechargeable battery having advantages of efficiently interrupting an electrical arc.

According to an embodiment of the present invention, there is provided a rechargeable battery that includes an electrode assembly, a case, a cap assembly, and an arc interrupter. The electrode assembly includes an anode, a cathode, and a separator interposed between the anode and the cathode. The case houses the electrode assembly and has an opening for the electrode assembly, and the cap assembly is coupled to the opening of the case and is electrically connected to the electrode assembly. The arc interrupter includes an interrupting member movably disposed in the cap assembly and a driving member connected to the interrupting member to transfer the interrupting member.

According to an aspect of the present invention, the driving member may include a material that changes shape according to temperature. The driving member may include a shape memory alloy or a bimetal.

According to an aspect of the present invention, the driving member may include an elastic body. Particularly, the driving member may include a compression spring.

According to an aspect of the present invention, the cap assembly may include a sub plate electrically connected to the electrode assembly and a vent plate having a welding protrusion protruding toward and connected to the sub plate. The arc interrupter is disposed between the vent plate and the sub plate.

According to an aspect of the present invention, the cap assembly may further include a middle plate disposed on the sub plate and electrically connected to the electrode assembly, and a cap insulating member disposed between the middle plate and the vent plate. The arc interrupter may further include a supporting member being in contact with the cap insulating member, and the driving member may be secured to an end of the supporting member.

According to an aspect of the present invention, the interrupting member may have an area greater than a bottom area of the welding protrusion.

According to an aspect of the present invention, the cap assembly may include a sub plate electrically connected to the electrode assembly and a vent plate having a welding protrusion protruding toward and connected to the sub plate. The interrupting member may be in contact with the welding protrusion. A surface of the interrupting member contacting the welding protrusion may be curved to correspond to the welding protrusion, and the surface may be in close contact with the welding protrusion.

According to an aspect of the present invention, the interrupting member may include an insulating material.

According to an aspect of the present invention, if an electrical arc generates in the cap assembly, then the arc interrupter works automatically and thus can interrupt the electrical arc.

In addition, according to an embodiment of the present invention, the surface of the interrupting member contacting the welding protrusion is curved to correspond to the shape of the welding protrusion. Accordingly, the interrupting member can be completely in contact with the welding protrusion, and a stress applied to the welding protrusion can be uniformly distributed.

According to another embodiment of the present invention, there is provided a cap assembly of a rechargeable battery comprising a sub plate; a vent plate that contacts the sub plate and that separates from the sub plate under a predetermined pressure condition; and an arc interrupter including an interrupting member that moves into a position between the vent plate and the sub plate when the vent plate separates from the sub plate.

According to another embodiment of the present invention, there is provided a cap assembly of a rechargeable battery comprising a sub plate that is electrically connected to an electrode assembly of the rechargeable battery; a vent plate including a protruding portion that contacts the sub plate and that separates from the sub plate under a predetermined pressure condition of the rechargeable battery; and an arc interrupter including an interrupting member movably disposed in the cap assembly and a driving member connected to the interrupting member to move the interrupting member into a position between the protruding portion of the vent plate and the sub plate when the protruding portion of the vent plate separates from the sub plate.

According to another embodiment of the present invention, there is provided a rechargeable battery comprising an electrode assembly; a case housing the electrode assembly and having an opening for the electrode assembly; and a cap assembly including a sub plate that is electrically connected to an electrode assembly of the rechargeable battery; a vent plate that contacts the sub plate and that separates from the sub plate under a predetermined pressure condition of the rechargeable battery; and an arc interrupter including an interrupting member movably disposed in the cap assembly and a driving member connected to the interrupting member to move the interrupting member into a position between the vent plate and the sub plate when the vent plate separates from the sub plate Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
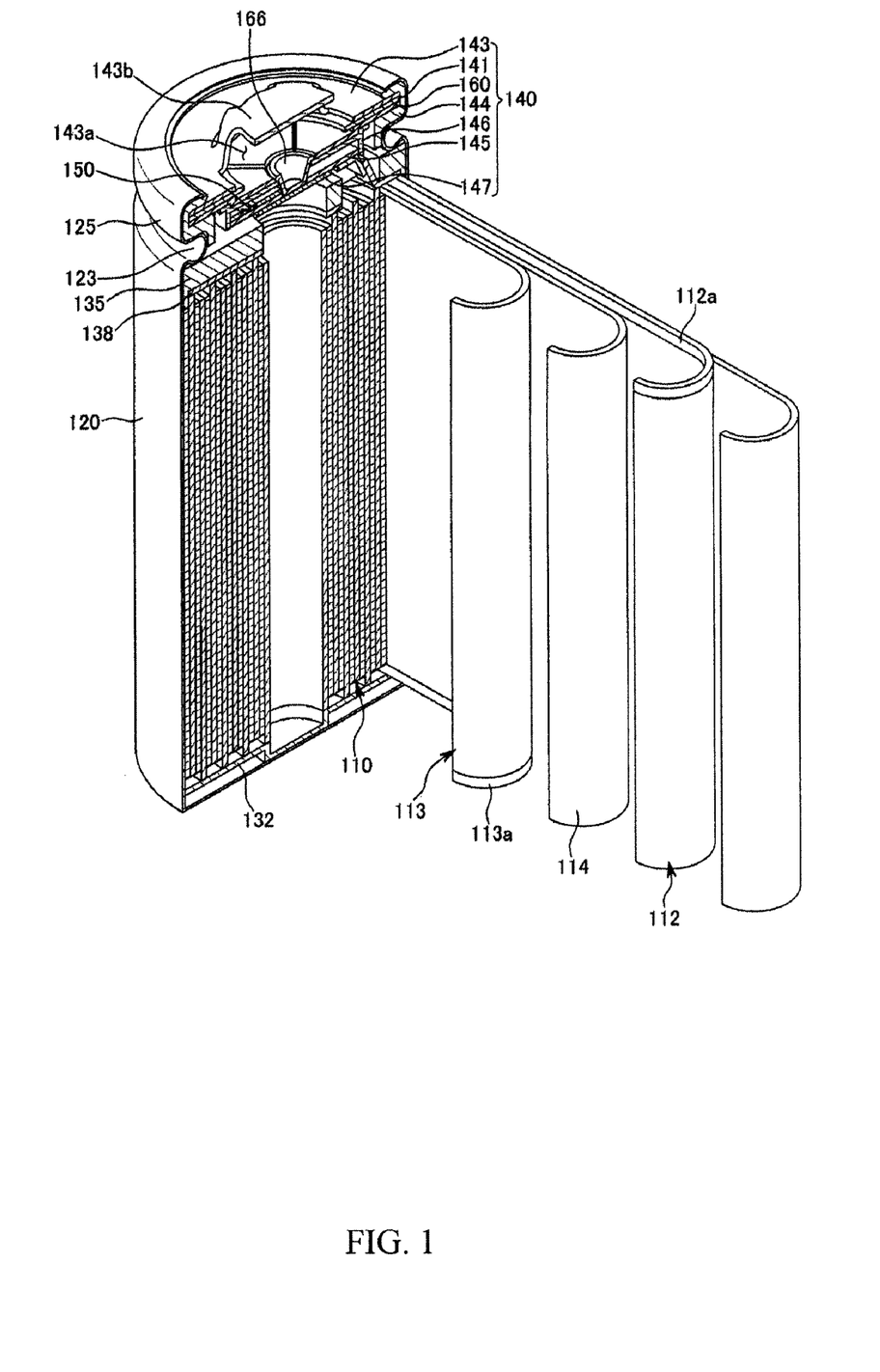
FIG. 1 is a cross-sectional perspective view of a rechargeable battery according to an embodiment of the present invention, including a partially exploded view of the electrode assembly.

FIG. 1 is a cross-sectional perspective view of a rechargeable battery according to an embodiment of the present invention, including a partially exploded view of the electrode assembly. Referring to FIG. 1, the rechargeable battery 100 according to an embodiment includes an electrode assembly 110, and a case 120. The electrode assembly 110 has an anode 112, a cathode 113, and a separator 114 interposed between the anode 112 and the cathode 113, and the case 120 has an opening formed at one end of the case 120 to house the electrode assembly 110 with an electrolyte solution. A cap assembly 140 is disposed at the opening of the case 120 and is electrically isolated from the case by a gasket 144.

The electrode assembly 100 according to the embodiment of FIG. 1 is formed in a cylindrical shape. That is, the anode 112, the separator 114, and the cathode 113 are sequentially stacked, and the resulting stack is rolled to form the electrode assembly 110 in a cylindrical shape commonly referred to as a "jelly-roll" type configuration. However, the structure of the electrode assembl1y 110 is not limited thereto, and can be formed in various structures.

An anode uncoated region 112a, which is not coated with an anode active material, is formed at an upper end of the anode 112. The anode 112 is electrically connected to an anode current collecting plate 138 through the anode uncoated region 112a. A cathode uncoated region 113a, which is not coated with a cathode active material, is formed at a lower end of the cathode 113. The cathode 113 is electrically connected to a cathode current collecting plate 132 through the cathode uncoated region 113a.

In the present embodiment, the anode current collecting plate 138 is disposed at the upper portion, and the cathode electrode current collecting plate 132 is disposed at the lower portion. However, the present invention is not limited thereto. Thus, the anode current collecting plate can be disposed at the lower portion, and the cathode electrode current collecting plate can be disposed at the upper portion.

A lower insulation member 135 is disposed on the anode current collecting plate 138 to insulate the current collecting plate 138 from the case 120. The lower insulation member 135 is disposed below a beading portion 123 to surround an outer periphery of the anode current collecting plate 138.

The case 120 is formed of a conductive metal such as steel coated with aluminum, an aluminum alloy, or nickel. The case 120 according to the present embodiment is formed in a cylindrical shape having an internal space to house the electrode assembly 110. After inserting the cap assembly 140 into the case 120, the cap assembly 140 is secured to the case 120 through a clamping process. In the clamping process, the beading portion 123 and a clamping portion 125 are formed.

The cap assembly 140 includes a cap plate 143 having a protruded outer terminal 143b and an exhaust port 143a. A vent plate 160 disposed under the cap plate 143 to discharge gas by being broken when a predetermined pressure condition is satisfied. The vent plate 160 interrupts the electrical connection between the electrode assembly 110 and the cap plate 143 if the predetermined pressure condition occurs.

A positive temperature coefficient element 141 is disposed between the cap plate 143 and the vent plate 160. The positive temperature coefficient element 141 unlimitedly increases electrical resistance when the temperature rises above a predetermined temperature. When the rechargeable battery 100 reaches a temperature higher than the predetermined value, the positive temperature coefficient element 141 interrupts the flow of charging or discharging current.

The vent plate 160 includes a step portion 165 (see FIGS. 3A to 3C) that protrudes toward the anode current collecting plate 138 and a welding protrusion 166 that protrudes toward the electrode assembly 110 on a center of the step portion 165. A sub plate 147 is attached to a bottom surface of the welding protrusion 166.

A middle plate 145 is disposed on and secured to the sub plate 147, and the welding protrusion 166 is inserted into a hole of the middle plate 145. The middle plate 145 is electrically connected to the anode current collecting plate 138 through a lead unit 132. A cap insulating member 146 is disposed between the middle plate 145 and the vent plate 160 to insulate the middle plate 145 from the vent plate 160.

The cap insulating member 146 is in contact with a bottom surface of the vent plate 160 and the welding protrusion 166 is inserted into a hole of the cap insulating member 146. A rib 146a (see FIGS. 3A to 3B) is formed toward the electrode assembly 110 on an outer periphery of the cap insulating member 146. An arc interrupter 150 is disposed between the cap insulating member 146 and the middle plate 145 to interrupt an electrical arc that may form upon deformation of the vent plate 160 during an abnormal high pressure condition of the rechargeable battery. The arc interrupter 150 is disposed to contact the rib 146a of the cap insulating member 146.

Figure 2:
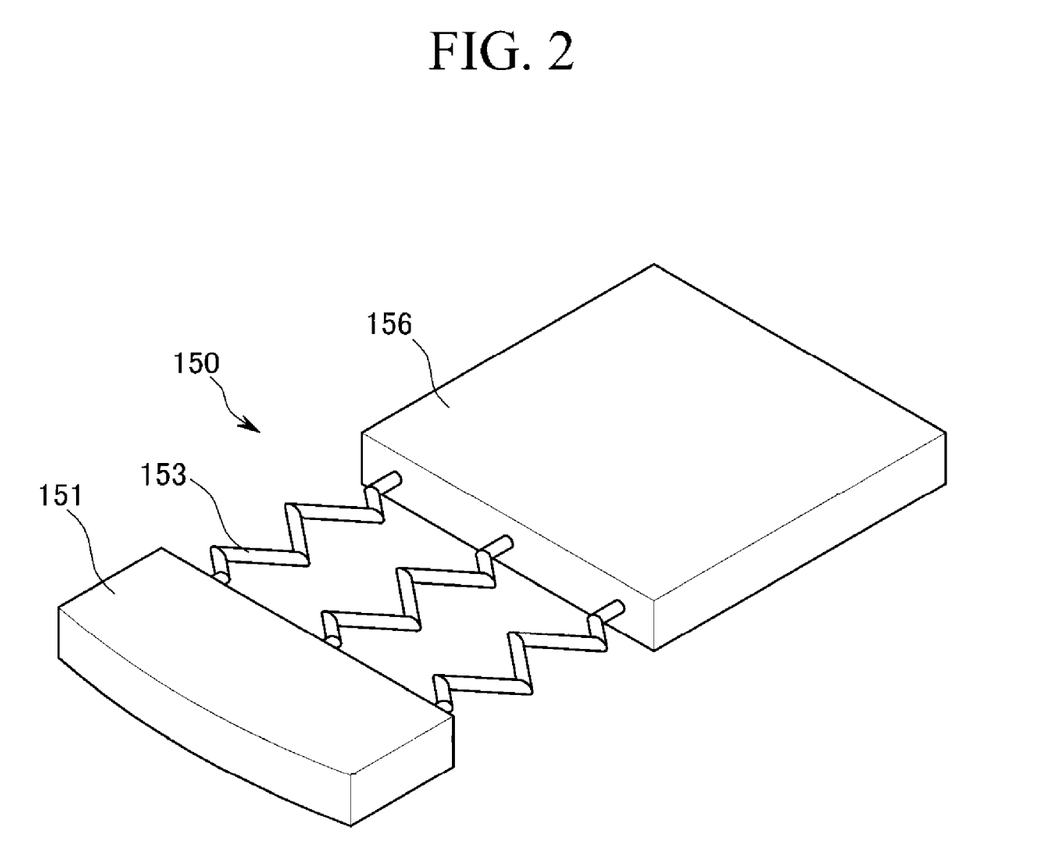
FIG. 2 is a perspective view of an arc interrupter according to an embodiment of the present invention.

FIG. 2 is a perspective view of the arc interrupter according to an embodiment of the present invention. Referring to FIG. 2, the arc interrupter 150 includes a supporting member 151, a driving member 153, and an interrupting member 156. The supporting member 151 is in contact with and secured to the rib 146a of the cap insulating member 146. The driving member 153 is secured to an end of the supporting member 151, and the interrupting member 156 is connected with and secured to the supporting member 153.

In the present embodiment, the supporting member 151 is secured to the cap insulating member 146. However, the present invention is not limited thereto and the supporting member 151 may be secured to the gasket 144.

The driving member 153 is made of a shape memory alloy. For example, the driving member 153 may be made of a thermoelastic martensite alloy, a non-thermoelastic martensite alloy, an Au—Cd alloy, and so on. In FIG. 2, the driving member 153 is in the form of a plurality of wires between the supporting member 151 and the interrupting member 156. The wires of the driving member 153 according to FIG. 2 have curved shapes at room temperature, and become straightened at a temperature greater than a predetermined value. However, the present invention is not limited thereto. Thus, the driving member 153 can have various shapes or configurations, such as a plate shape or a cylindrical shape.

As shown in FIG. 2, the interrupting member 156 is a quadrangle-shaped plate made of an insulating material. However, the present invention is not limited thereto. Thus, the interrupting member may have various shapes, such as a round-shaped plate. The interrupting member 156 has an area greater than a bottom surface of the welding protrusion 166 in order to stably interrupt an electrical arc.

Figure 3A:
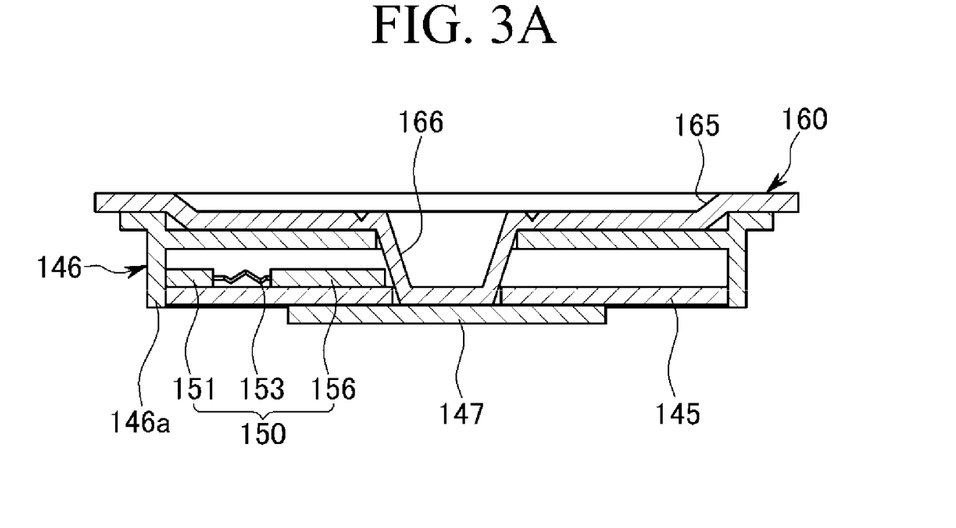
FIG. 3A to FIG. 3C are cross-sectional views showing an operation of the arc interrupter of FIG. 2.
Figure 3B:
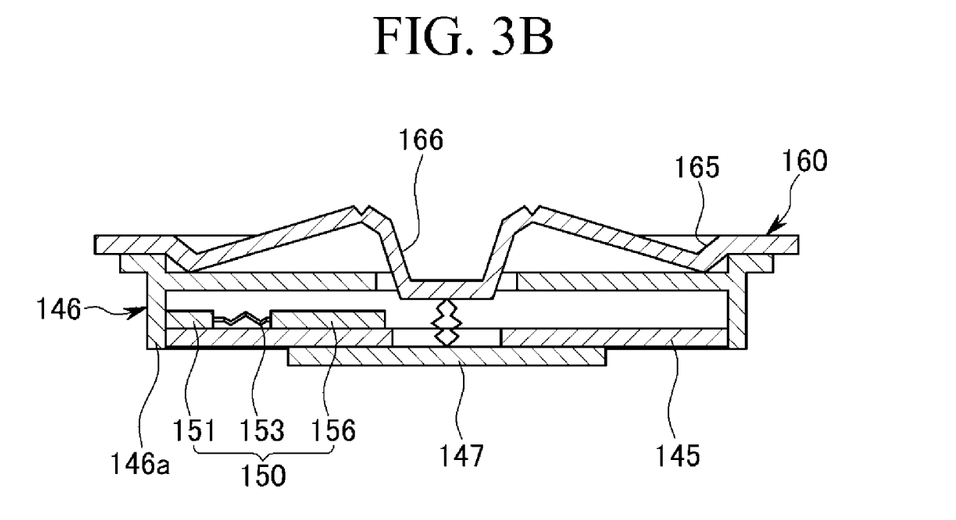
Figure 3C:
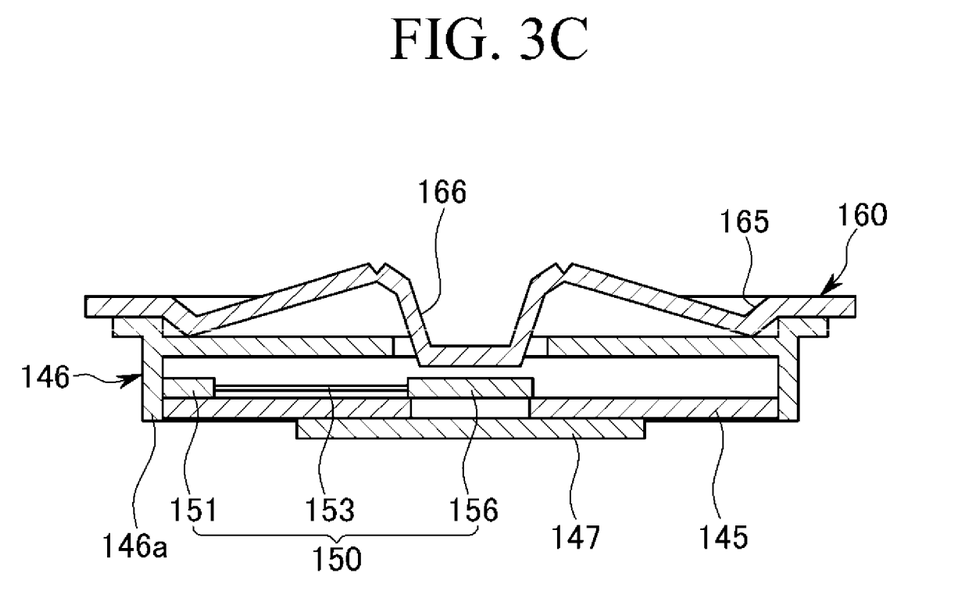

FIG. 3A to FIG. 3C are cross-sectional views showing an operation of the arc interrupter of FIG. 2. Referring to FIG. 3A, the arc interrupter 150 is disposed on the middle plate 145, and the interrupting member 156 is disposed to be adjacent to the welding protrusion 166.

As shown in FIG. 3B, if a pressure of the rechargeable battery becomes higher than the predetermined value, the welding protrusion 166 of the vent plate 160 moves upward and becomes separated from the sub plate 147. In the process, an electrical arc may be generated between the sub plate 147 and the welding protrusion 166. If an electrical arc is generated, the temperature of the cap assembly 140, including the temperature of the arc interrupter 150, quickly increases.

As shown in FIG. 3C, if the temperature of the arc interrupter 150 increases, the driving member 153 is deformed and moves the interrupting member 156 into a position between the welding protrusion 166 and the sub plate 147. When the interrupting member 156 becomes interposed between the welding protrusion 166 and the sub plate 147, the electrical arc and a discharge generated by the electrical arc disappears.

According to the present exemplary embodiment, if an electrical arc is generated and the temperature of the arc interrupter increases simultaneously, the driving member 153 automatically operates. Accordingly, generation of the electrical arc can be efficiently halted.

Figure 4:
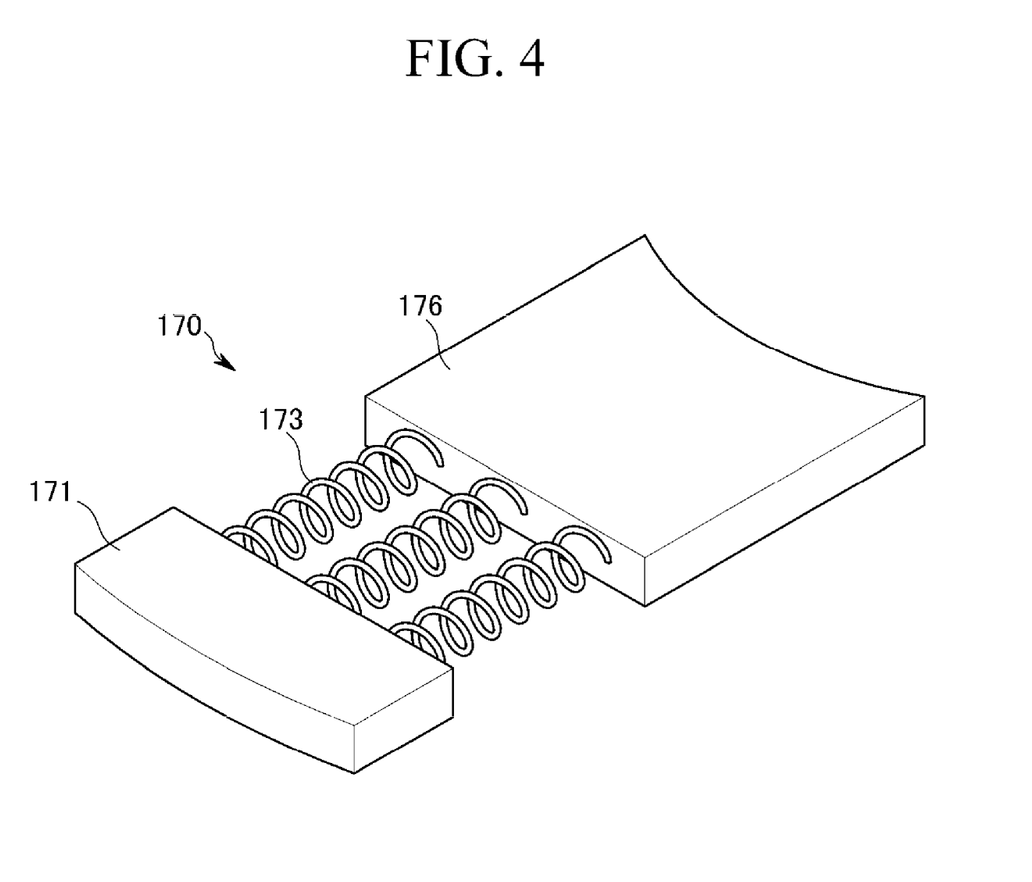
FIG. 4 is a perspective view of an arc interrupter according to another embodiment of the present invention.

FIG. 4 is a perspective view of an arc interrupter according to another embodiment of the present invention. Referring to FIG. 4, an arc interrupter 170 includes a supporting member 171, a driving member 173, and an interrupting member 176. An end of the driving member 173 is secured to the supporting member 171, and the interrupting member 176 is secured to the other end of the driving member 173. The interrupting member 176 is in contact with and presses against the welding protrusion 166 (refer to FIG. 3). In the present embodiment, the driving member 173 is made of the compression spring. The driving member 173 shown in FIG. 4 is in the form of at least one compression spring. However, it is to be understood that the present invention is not limited thereto and that the driving member 173 may be made of any elastic body that can apply a biasing force to the interrupting member 176.

A surface of the interrupting member 176 contacting the welding protrusion 166 is curved to correspond to the contour of the welding protrusion 166 in order to distribute a stress applied to the welding protrusion 166.

If the welding protrusion 166 moves upward and is separated from the sub plate 147 in response to an abnormal pressure in the battery, the compression spring of the driving member 173 moves the interrupting member 176 into a position between the welding protrusion 166 and the sub plate 147. Accordingly, an electrical arc generated between the welding protrusion 166 and the sub plate 147 can be stably prevented or halted.

Figure 5:
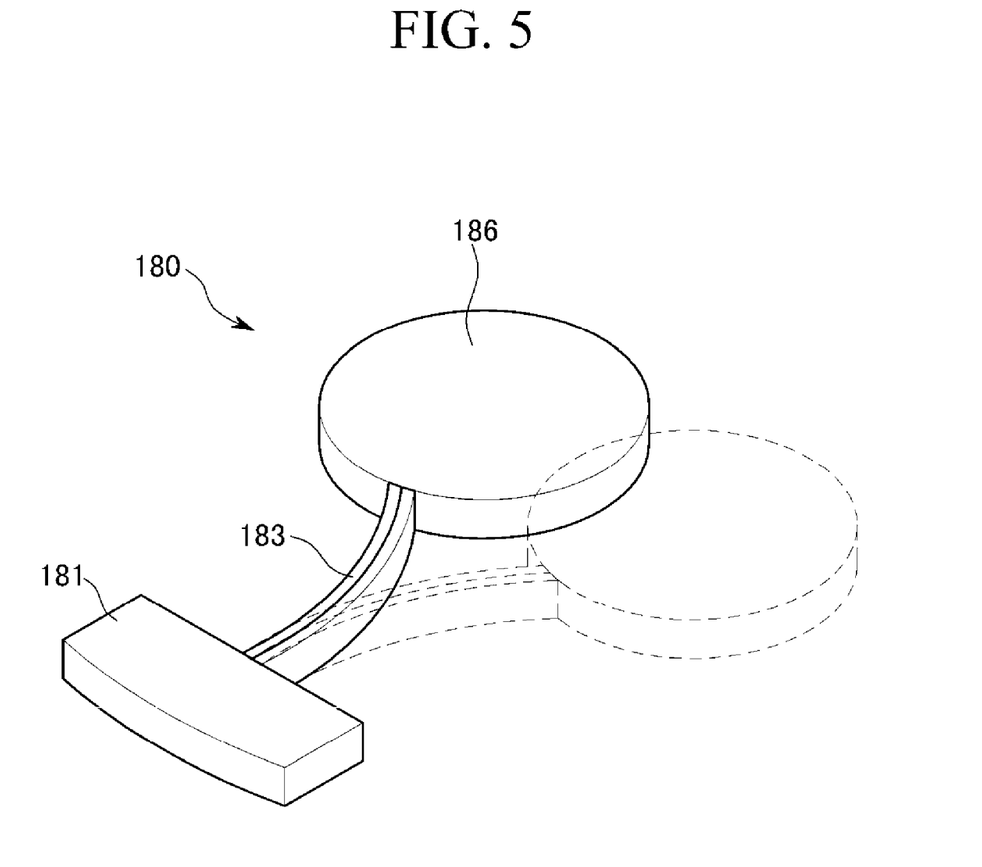
FIG. 5 is a perspective view of an arc interrupter according to another embodiment of the present invention.

FIG. 5 is a perspective view of an arc interrupter according to yet another embodiment of the present invention. Referring to FIG. 5, an arc interrupter 180 includes a supporting member 181, a driving member 183, and an interrupting member 186. An end of the driving member 183 is secured to the supporting member 181, and the interrupting member 186 is secured to the other end of the driving member 183.

The driving member 183 of the present embodiment is a bimetal. The bimetal is formed by adhering two materials having different heat expansion coefficients. The bimetal becomes curved in one direction or another depending on a temperature change.

The interrupting member 186 is a round-shaped plate, and is disposed next to the welding protrusion 166 (refer to FIG. 3). That is, the interrupting member 186 is located at a position where a welding protrusion 166 is not located in a normal condition. If an electrical arc generates and temperature increases, the driving member 183 curvature of the driving member 183 is altered so that the interrupting member 186 is transferred to a position between the welding protrusion 166 and the sub plate 147. According to the present embodiment, if the electrical arc is generated and the temperature of the interrupting member increases, the driving member 186 automatically operates. Accordingly, the electrical arc can be efficiently halted.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cap assembly of a rechargeable battery comprising:
a sub plate;
a vent plate that contacts the sub plate and that separates from the sub plate under a predetermined pressure condition; and
an arc interrupter including an interrupting member that moves into a position between the vent plate and the sub plate when the vent plate separates from the sub plate
wherein the vent plate includes a protruding portion that contacts the sub plate and that separates from the sub plate under a predetermined pressure condition of the rechargeable battery, and wherein the arc interrupter further includes a driving member connected to the interrupting member to move the interrupting member into a position between the protruding portion of the vent plate and the sub plate when the protruding portion of the vent plate separates from the sub plate; and
wherein the driving member includes a material that changes shape according to temperature such that the driving member transmits a biasing force to the interrupting member when the temperature of the driving member exceeds a predetermined temperature.

2. The cap assembly of claim 1, wherein the interrupting member comprises an insulating material that blocks a forming of an electrical arc between the sub plate and the protruding portion of the vent plate when the protruding portion of the vent plate separates from the sub plate and the interrupting member is moved into the position between the protruding portion of the vent plate and the sub plate.

3. The cap assembly of claim 1, wherein the driving member elastically biases the interrupting member against the protruding portion of the vent plate when the protruding portion of the vent plate contacts the sub plate.

4. The cap assembly of claim 3, wherein the interrupting member and the protruding portion of the vent plate have complementary shapes across a region where the interrupting member and the protruding portion of the vent plate contact each other, such that a biasing force of the interrupting member against the protruding portion of the vent plate is uniformly distributed.

5. The cap assembly of claim 1, wherein the arc interrupter further includes a supporting member supported in a fixed position in the cap assembly and wherein the driving member connects the supporting member and the interrupting member.

6. A rechargeable battery comprising:
an electrode assembly;
a case housing the electrode assembly and having an opening for the electrode assembly; and
a cap assembly including
a sub plate that is electrically connected to an electrode assembly of the rechargeable battery;
a vent plate including a protruding portion that contacts the sub plate and that separates from the sub plate under a predetermined pressure condition of the rechargeable battery; and
an arc interrupter including an interrupting member movably disposed in the cap assembly and a driving member connected to the interrupting member to move the interrupting member into a position between the protruding portion of the vent plate and the sub plate when the protruding portion of the vent plate separates from the sub plate.

7. A rechargeable battery comprising:
an electrode assembly including an anode, a cathode, and a separator interposed between the anode and the cathode;
a case housing the electrode assembly and having an opening for the electrode assembly;
a cap assembly coupled to the opening of the case and electrically connected to the electrode assembly; and
an arc interrupter including an interrupting member movably disposed in the cap assembly and a driving member connected to the interrupting member to transfer the interrupting member.

8. The rechargeable battery of claim 7, wherein:
the driving member includes a material that changes shape according to temperature.

9. The rechargeable battery of claim 7, wherein:
the driving member includes a shape memory alloy.

10. The rechargeable battery of claim 7, wherein:
the driving member includes a bimetal.

11. The rechargeable battery of claim 7, wherein:
the driving member includes an elastic body.

12. The rechargeable battery of claim 7, wherein:
the driving member includes a compression spring.

13. The rechargeable battery of claim 7, wherein:
the cap assembly comprises a sub plate electrically connected to the electrode assembly and a vent plate having a welding protrusion protruding toward and connected to the sub plate, and wherein the arc interrupter is disposed between the vent plate and the sub plate.

14. The rechargeable battery of claim 13, wherein:
the cap assembly further comprises a middle plate disposed on the sub plate and electrically connected to the electrode assembly, and a cap insulating member disposed between the middle plate and the vent plate,
wherein the arc interrupter further comprises a supporting member being in contact with the cap insulating member, and
wherein the driving member is secured to an end of the supporting member.

15. The rechargeable battery of claim 13, wherein:
the interrupting member has an area greater than a bottom area of the welding protrusion.

16. The rechargeable battery of claim 12, wherein:
the cap assembly comprises a sub plate electrically connected to the electrode assembly and a vent plate having a welding protrusion protruding toward and connected to the sub plate, and the interrupting member is in contact with the welding protrusion.

17. The rechargeable battery of claim 16, wherein:

a surface of the interrupting member contacting the welding protrusion is curved to correspond to the welding protrusion, and the surface is in close contact with the welding protrusion.

18. The rechargeable battery of claim 7, wherein:

the interrupting member includes an insulating material.

* * * * *